(12) United States Patent
Kraaijeveld

(10) Patent No.: US 8,006,774 B2
(45) Date of Patent: Aug. 30, 2011

(54) DEVICE FOR CUTTING SLITS IN A SURFACE

(75) Inventor: Teunis Jan Willem Kraaijeveld, Barendrecht (NL)

(73) Assignee: Gebr. Kraaijeveld B.V. (NL)

( * ) Notice: Subject to any disclaimer, the term of this patent is extended or adjusted under 35 U.S.C. 154(b) by 0 days.

(21) Appl. No.: 11/970,061

(22) Filed: Jan. 7, 2008

(65) Prior Publication Data

US 2008/0164040 A1 Jul. 10, 2008

(30) Foreign Application Priority Data

Jan. 8, 2007 (NL) ...................................... 1033182

(51) Int. Cl.
*A01B 45/04* (2006.01)
(52) U.S. Cl. ........................................... 172/20; 172/22
(58) Field of Classification Search .................... 172/19, 172/20, 21, 22
See application file for complete search history.

(56) References Cited

U.S. PATENT DOCUMENTS

| 1,829,745 | A | * | 11/1931 | Grossi | 111/154 |
|---|---|---|---|---|---|
| 2,258,061 | A | * | 10/1941 | Krenzke | 172/256 |
| 2,464,038 | A | * | 3/1949 | Horth | 172/21 |
| 2,881,847 | A | * | 4/1959 | Strasel | 172/21 |
| 3,207,342 | A | * | 9/1965 | Trojan | 414/705 |
| 3,319,365 | A | * | 5/1967 | Perry et al. | 37/94 |
| 3,993,143 | A | * | 11/1976 | Moreland, Jr. | 172/22 |
| 4,148,362 | A | * | 4/1979 | Orth | 172/22 |
| 5,036,651 | A | * | 8/1991 | Nelson | 56/16.4 R |
| 5,069,293 | A | * | 12/1991 | St. Romain | 172/22 |
| 5,351,634 | A | * | 10/1994 | Patton | 111/77 |
| 5,802,994 | A | * | 9/1998 | Kinkead et al. | 111/11 |
| 6,024,033 | A | * | 2/2000 | Kinkead et al. | 111/11 |
| 6,488,100 | B2 | * | 12/2002 | Underhill | 172/22 |

* cited by examiner

*Primary Examiner* — Thomas B Will
*Assistant Examiner* — Joel Mitchell
(74) *Attorney, Agent, or Firm* — McDonnell Boehen Hulbert & Berghoff

(57) ABSTRACT

The invention relates to a device for cutting slits in a surface, for instance a turf cover, comprising a frame displaceable over the surface, a movable cutter on the frame and oriented during use toward the surface for the purpose of cutting slits in the surface. The invention is distinguished in that the device comprises collecting means for collecting the material cut from the surface by means of the cutter.

The invention also relates to a dispensing device, comprising a filler material container, a channel to an outflow opening oriented toward a slit, which channel is connected to the filler material container, and a dispensing mechanism in at least one of the channel and the filler material container.

17 Claims, 3 Drawing Sheets

DEVICE FOR CUTTING SLITS IN A SURFACE

BACKGROUND OF THE INVENTION

The invention relates to a device for cutting slits in a surface, for instance a turf cover, comprising a frame displaceable over the surface, a movable cutter on the frame and oriented during use toward the surface for the purpose of cutting slits in the surface.

Such devices are known for aerating a turf cover, wherein slits are cut into the turf cover, for instance in order to remove dead grass and moss from the turf cover and thereby enhance growth of the turf cover. The known art has drawbacks. When the slits are cut in the turf cover, the material that has been cut away is left on the turf cover. In addition to the fact that this material which has been cut away and left behind can inhibit the growth of the grass, this material adversely affects the performance characteristics of the turf cover in the case of for instance playing fields. On golf courses material on the turf cover is particularly undesirable, for instance on the green, where the golf ball rolls over the turf cover. This is because, as a result of the material on the turf cover, the golf ball will behave unpredictably, to the detriment of enjoyment in playing. The material left behind moreover has an adverse effect on the appearance of the turf cover.

SUMMARY OF THE INVENTION

The invention has for its object to obviate, or at least alleviate these drawbacks. The invention is distinguished for this purpose in that the device comprises collecting means for collecting the material cut from the surface by means of the cutter. This measure makes it possible to collect and take the cut-away material to a desired location. These collecting means can for instance comprise a conveyor belt which carries the cut-away material to an auxiliary vehicle with a collecting bin.

In a preferred embodiment of the device according to the invention the cutter can be moved in order to throw up material from the surface in a throw-up direction. In an additional embodiment of the device according to the invention the collecting means are located in the throw-up direction. These measures have the advantage that, in addition to the cutter, no additional means are necessary for the purpose of carrying the cut-away material from the surface to the collecting means.

In a further additional embodiment of the device according to the invention the collecting means lie behind the cutter relative to the direction of displacement of the device. This measure is particularly favourable when the device according to the invention is coupled to a pulling vehicle situated in front of the device relative to the direction of displacement, since the driver then for instance has a good view of the part of the device where the cutter is situated. The driver can hereby properly assess from where and to where cutting can take place.

In a further additional embodiment of the device according to the invention the device comprises a hood for guiding in the direction of the collecting means the material cut out of the surface by means of the cutter. This measure has the advantage that cut-away material which is not thrown up in the direction of the collecting means still comes to lie in the collecting means.

In a further additional embodiment of the device according to the invention the cutter comprises a blade on a rotatable shaft. This measure forms a simple, easily replaceable realization of the moving cutter. This is for instance advantageous for the maintenance of the device.

In a further additional embodiment of the device according to the invention the collecting means comprise a collecting bin. This measure makes it possible to employ the device wholly autonomously, without for instance auxiliary vehicles to take away the cut-away material.

In a preferred embodiment of the device according to the invention with collecting bin, the device comprises a tipping mechanism between the frame and the collecting bin, with which the collecting bin can be moved between a position of use and a tipping position. During tipping the collecting bin is held upside down, whereby all the material collected in the collecting bin falls out of the collecting bin. This has for instance the advantage that the collecting bin can be emptied quickly.

In an additional embodiment of the device according to the invention with tipping collecting bin, the collecting bin can be tipped about a tipping axis which is defined in the tipping mechanism and which is oriented relative to the direction of displacement of the device such that the collecting bin can be tilted substantially transversely relative to the direction of displacement of the device. This measure is particularly advantageous when the device according to the invention is coupled to a pulling vehicle which is situated in front of the device relative to the direction of displacement, since the driver then has a good view of the emptying of the collecting bin.

In an additional embodiment of the device according to the invention with tipping collecting bin, the tipping mechanism comprises a hinge which defines a tipping axis and with which the collecting bin is coupled pivotally to the frame, a drive arm which extends over a distance from the hinge defining the tipping axis, and a drive which is connected to the drive arm. This mechanism enables a tipping movement with simple driving, for instance a lifting cylinder. This is for instance advantageous for the maintenance of the device. In an additional embodiment thereof the tipping mechanism comprises a transmission between the drive arm and the drive. When a lifting cylinder is for instance used as drive, this measure enables a tipping movement over a large tipping angle with a limited stroke of the lifting cylinder.

In a favourable additional embodiment the device according to the invention comprises a filler material container and a channel to an outflow opening oriented toward a cut slit, which channel is connected to the filler material container. This measure makes it possible to fill the cut slit with a filler material. This has the advantage that the slit does not collapse when the surface is loaded. Collapse of a slit results in unevenness of the surface, which, in for instance the case of playing fields, has an adverse effect on the performance characteristics. In addition, the surface lying between two slits can move reciprocally in the case of surfaces in which slits are cut close together, and this results in an unstable surface. Filling of the slits with a filler material prevents this. When filler material with good drainage properties is applied, the drainage of the surface will moreover be improved.

In an additional embodiment hereof the channel is located below the collecting means. This measure makes it possible to position the outflow opening a short distance from the cutter, while the filler material container is located behind the collecting bin. This has the advantage that both the cut-away material is collected and the slit is prevented from collapsing before it is filled with filler.

In an additional embodiment of the device according to the invention with filler material container, the device comprises a dispensing mechanism in at least one of the channel and the filler material container for the purpose of dispensing filler material to the outflow opening. This measure makes it possible to adjust the amount of filler material flowing into the slit to for instance the depth of the slit and to the speed at which the device is displaced over the surface, so that the surface does not display any unevenness after the slit has been filled. This has the advantage, for instance in the case of a playing field, that the playing field can be played on immediately after filling of the slit.

In an additional embodiment of the device according to the invention with dispensing mechanism, the dispensing mechanism comprises a rotatable dispensing shaft on which flexible blades are arranged, which flexible blades carry the filler material, which is situated on the side of the dispensing roller remote from the outflow opening, in the direction of the outflow opening when the dispensing shaft is rotated and hold back the filler material when the dispensing shaft is stationary. In an alternative embodiment hereof, the dispensing mechanism comprises a conveyor belt which extends between the filler material container and the outflow opening. During use the filler material can be carried from the filler material container and in the direction of the outflow opening by means of this conveyor belt. The dispensing of filler material to the outflow opening then depends for instance on the speed of the conveyor belt.

In an additional embodiment of the device according to the invention with dispensing mechanism, the dispensing mechanism comprises an adjusting slide. This adjusting slide makes it possible to adjust the quantity of filler material which is carried during use in the direction of the outflow opening. The adjusting slide can be applied autonomously as well as in combination with the dispensing shaft or with the conveyor belt.

In a further additional embodiment of the device according to the invention with dispensing mechanism, the device comprises a transmission for driving the dispensing mechanism in accordance with the displacement speed of the device such that the degree of dispensing of the filler material to the outflow openings depends on the displacement speed of the device over the surface. This measure has the advantage that, even when the displacement speed of the device changes, the slit is still filled with the required quantity of filler material. In an additional embodiment hereof the transmission is connected to at least one of the drive motor, wheel, support roller etc.

In a further additional embodiment of the device according to the invention with filler material container, the device comprises agitating means at the outflow opening, by means of which agitating means the filler material can be loosened. This measure makes it possible to prevent blockages in the outflow opening, for instance as a result of arching.

In a further additional embodiment of the device according to the invention the device comprises a slit blade a short distance behind the cutter relative to the direction of displacement of the device, which blade extends at least during use in a cut slit. This slit blade makes it possible to correct unevenness in the slit as a result of the cutting. Particularly in a device according to the invention where the slit is filled with filler material, the slit blade has the advantage that the slit does not collapse before it is filled with filler material.

In a further additional embodiment of the device according to the invention the device comprises height-adjusting means for adjusting the distance between the frame and the surface, and thereby for adjusting the depth of the slit which is cut by the cutter during use.

The device also relates to a dispensing device which comprises a filler material container, a channel to an outflow opening oriented toward a slit, which channel is connected to the filler material container, and a dispensing mechanism in at least one of the channel and the filler material container.

BRIEF DESCRIPTION OF THE DRAWINGS

The present invention will be further elucidated hereinbelow on the basis of an exemplary embodiment which is shown in the accompanying figures. This is a non-limitative exemplary embodiment. In the figures.

DETAILED DESCRIPTION OF THE PREFERRED EMBODIMENTS

Figure 1:
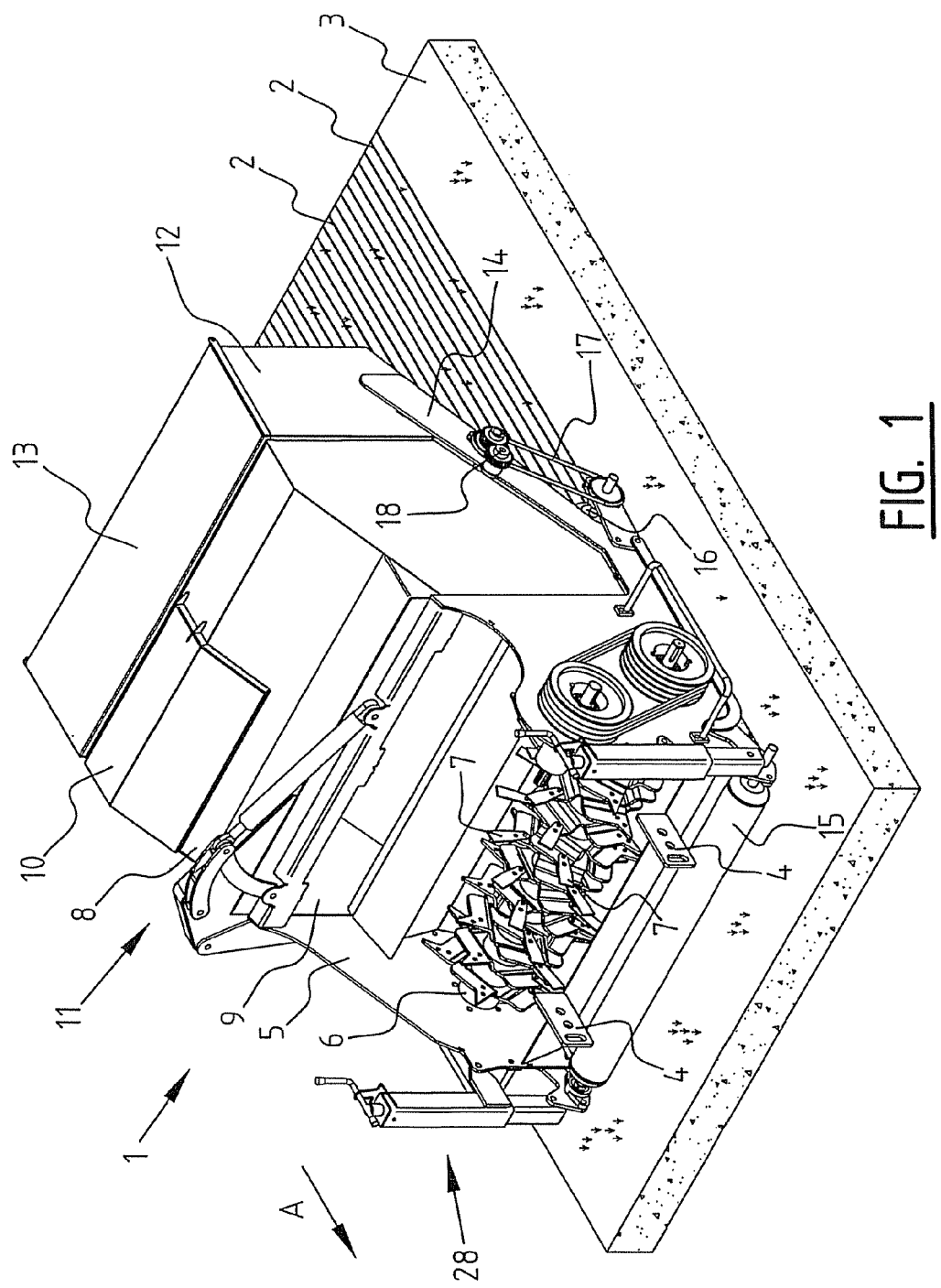
FIG. 1 shows a perspective view of a device according to the invention.

FIG. 1 shows a device according to the invention 1 with which slits 2 can be cut in a turf cover 3 forming a surface. Device 1 is attached by means of fixing eyes 4 to a pulling vehicle (not shown) which displaces device 1 over turf cover 3 in the direction of arrow A. Device 1 has a frame 5 with a rotatable shaft 6 on this frame 5. Blades 7 forming the cutter are arranged on rotatable shaft 6 for cutting slits 2 in turf cover 3. The distance between the frame and the surface, and thereby the depth d of the slit which is cut by the cutter during use, can be adjusted by means of height adjustment 28. Behind blades 7 the device 1 has a collecting bin 8 forming collecting means, with a collecting opening 9 and collecting bin cover 10 for collecting the material cut from turf cover 3 by means of blades 7. A hood (not shown) can be arranged over rotatable shaft 6 and blades 7, whereby during use the material thrown up by means of blades 7 is guided in the direction of collecting bin 8. Collecting bin 8 is connected to frame 5 for tipping by means of tipping mechanism 11. Behind collecting bin 8 the device 1 has a filler material container 12 with a filler material container cover 13, which is filled with filler material for filling slits 2. A channel 14 connected to filler material container 12 is located below collecting bin 8. Arranged in channel 14 is a dispensing mechanism (not shown) which dispenses filler material from filler material container 12 to slits 2. Device 1 supports on turf cover 3 by means of a front and a rear support roller 15 and 16. The rear support roller 16 rotates as device 1 displaces over turf cover 3 and herein drives the dispensing mechanism in channel 14 via the transmission-forming belt 17 and gear combination 18. The dispensing speed of the dispensing mechanism in channel 14 hereby depends on the displacement speed of device 1.

Figure 2:
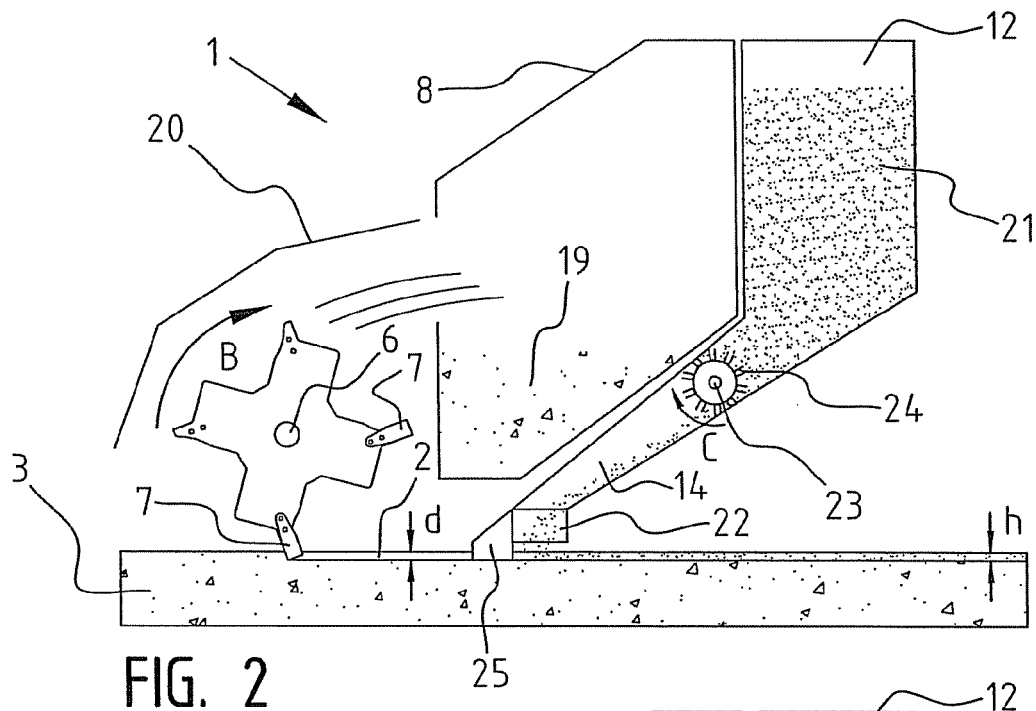
FIG. 2 shows a schematic view in longitudinal section of a device according to the invention having a dispensing shaft with blades as dispensing mechanism.
Figure 3:
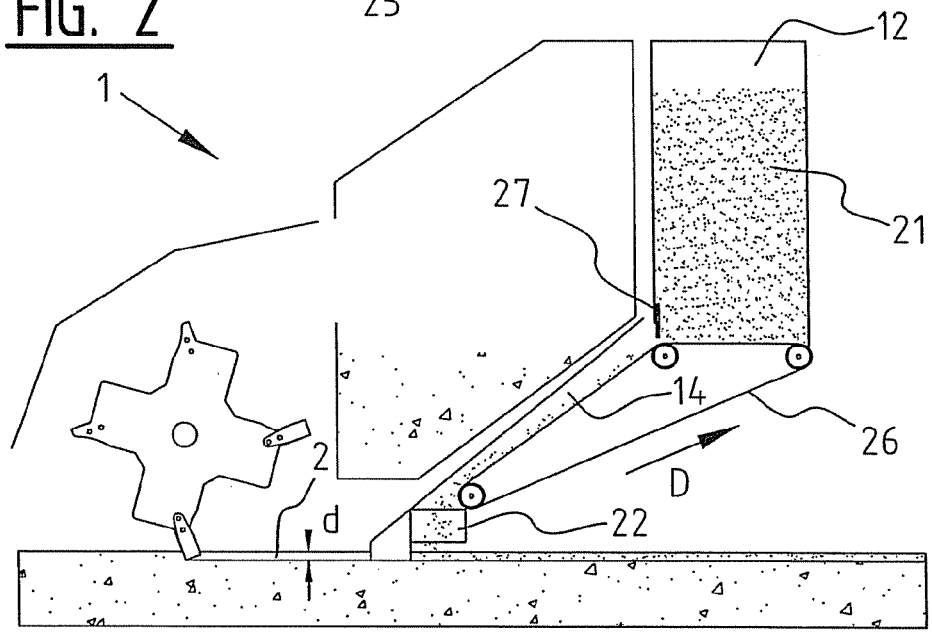
FIG. 3 shows a schematic view in longitudinal section of a device according to the invention having a conveyor belt as dispensing mechanism.

FIG. 2 and FIG. 3 show a schematic view of the effecting of a slit filled with filler material 21 by means of the device of FIG. 1.

FIG. 2 show rotatable shaft 6 with blades 7 thereon. As rotatable shaft 6 rotates in the direction of arrow B a slit 2 with a depth d is cut into turf cover 3. The material 19 cut from turf cover 3 is thrown up by blades 7 and guided by means of hood 20 to collecting bin 8. Filler material container 12 with filler material 21 therein is shown behind collecting bin 8. Shown below collecting bin 8 is channel 14 which connects the filler material container 12 to outflow opening 22. Dispensing shaft 23 with flexible blades 24 thereon is shown in channel 14. Dispensing shaft 23 can be driven in the direction of arrow C by means of the belt 17 shown in FIG. 1, whereby the rotation speed of dispensing shaft 23 depends on the displacement speed of device 1. When dispensing shaft 18 rotates in the direction of arrow C, flexible blades 24 carry filler material 21 in the direction of outflow opening 22. When shaft 23 is stationary, flexible blades 24 hold back the filler material 21 because they lie against the wall of channel 14. Slit 2 is filled with filler material 21 dispensed to outflow opening 22 by means of dispensing shaft 23 and flexible blades 24 up to height h, which corresponds substantially to depth d of slit 2. A turf cover 3 without unevenness is hereby realized. In front of outflow opening 22 a slit blade 25 cuts through slit 2 in order to hold slit 2 open before it is filled with filler material 21.

In contrast to FIG. 2, FIG. 3 shows a conveyor belt 26 instead of dispensing shaft 23. Conveyor belt 26 can be driven in the direction of arrow D by means of the belt 17 shown in FIG. 1, whereby the transporting speed of conveyor belt 26 depends on the displacement speed of the device. By driving conveyor belt 26 in the direction of arrow D filler material 21 is carried out of filler material container 12 in the direction of outflow opening 22. Shown between filler material container 12 and channel 14 is an adjusting slide 27 with which the quantity of filler material 21 carried along by means of conveyor belt 26 can be adjusted. The amount dispensed can hereby be adjusted to for instance the depth d of slit 2.

Figure 4:
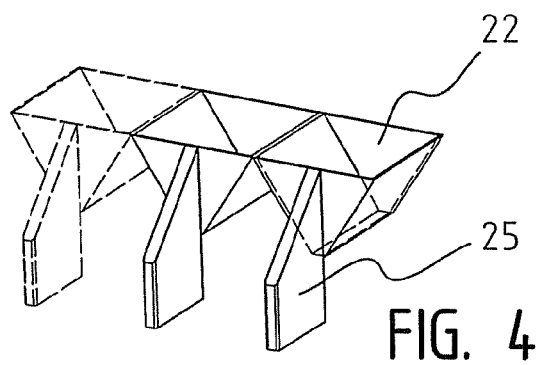
FIG. 4 shows a perspective view of three outflow openings for a device according to the invention.

FIG. 4 shows three mutually adjacent, funnel-shaped outflow openings 22 on which solid slit blades 25 are arranged. At outflow openings 22 can be arranged agitating means (not shown) which prevent the funnel-shaped outflow openings 22 from becoming blocked with filler material. These agitating means can for instance be a rotating stirring rod or brush.

Figure 6:
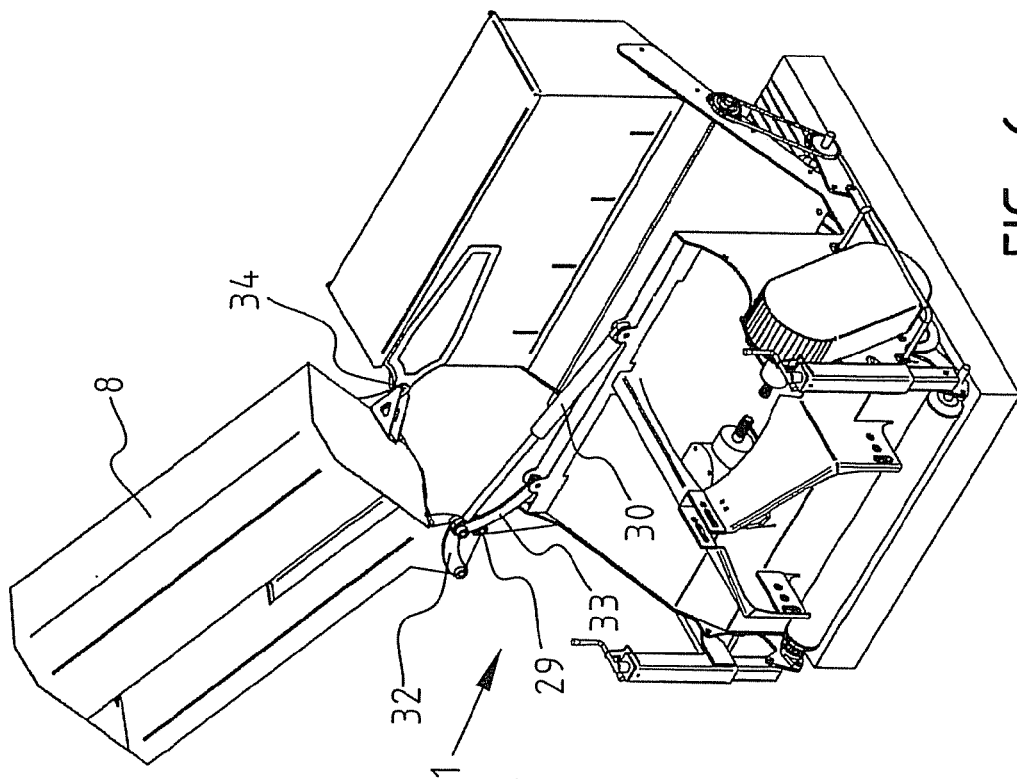
FIG. 6 shows a perspective view of a device according to the invention with a tipping collecting bin in the tipping position.
Figure 5:
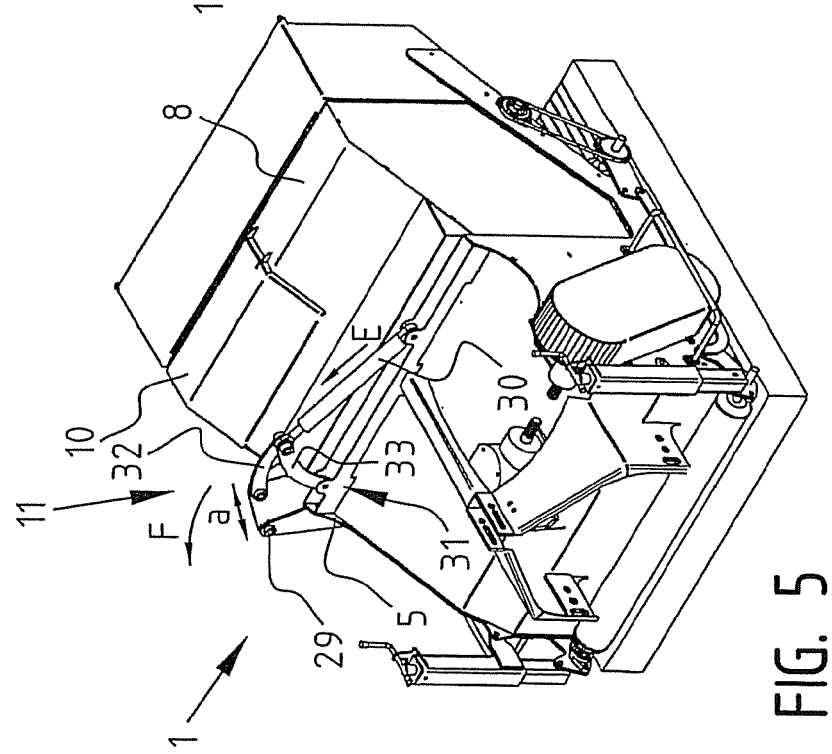
FIG. 5 shows a perspective view of a device according to the invention with a tipping collecting bin in the position of use.

FIG. 5 and FIG. 6 show the operation of tipping mechanism 11 of the device of FIG. 1 for the purpose of tipping collecting bin 8. FIG. 5 shows device 1 with collecting bin 8 in the position of use. Collecting bin 8 is connected to frame 5 by means of tipping mechanism 11. Tipping mechanism 11 has two tipping axis-defining hinges 29 and 34 (of which hinge 34 can only be seen in FIG. 6), with which collecting bin 8 is pivotally coupled to frame 5. Tipping mechanism 11 also has a lifting cylinder 30 which forms a drive and which is coupled pivotally to frame 5. By means of transmission 31 the lifting cylinder 30 engages on collecting bin 8 at a drive arm-forming distance a from the tipping axis-defining hinge 29. Transmission 31 consists of a connecting piece 32 coupled pivotally to collecting bin 8 and lifting cylinder 30 and a lever 33 coupled pivotally to frame 5 and lifting cylinder 30. By extending lifting cylinder 30 in the direction of arrow E the bin tips round the tipping axis, which is defined by the tipping axis-defining hinge 29, in the direction of arrow F. The tipping position of collecting bin 8 shown in FIG. 6 is herein realized. When collecting bin 8 is tipped the collecting bin cover 10 is opened, whereby the material collected in collecting bin 8 can be emptied adjacently of device 1.

In FIG. 1 the cutters are blades arranged on a rotatable shaft. The cutters can for instance also be circular cutters around a rotatable shaft, as in a circular saw, or blades on a chain as in a chainsaw.

FIG. 1 shows the device as a machine which must be arranged on a pulling vehicle. The device can also be given a self-propelling form.

FIG. 1 shows the filler material container behind the collecting bin. The filler material container can for instance also be arranged in front of the collecting bin, wherein the cut-away material is for instance thrown or carried over the filler material container in the direction of the collecting bin.

In FIG. 1 the dispensing device is driven by means of a support roller. The dispensing device can for instance also be driven by means of a wheel or a motor, the control of which is coupled to the tachograph of the pulling vehicle so that the drive of the dispensing device depends on the displacement speed of the device.

FIG. 1 shows the transmission between the support roller and the dispensing device as a belt with a gear combination.

FIG. 2 and FIG. 3 show the slit blade coupled to the outflow opening. The slit blade can also be located some distance in front of the outflow opening.

FIG. 2 and FIG. 3 show the outflow opening below the collecting bin. The outflow opening can for instance also be located directly below the filler material container.

FIG. 3 shows a flat conveyor belt. The conveyor belt can for instance also have upright ribs as blades. If necessary, these blades can for instance prevent filler material sliding off the conveyor belt when the device is stationary.

FIG. 3 shows an adjusting slide. The conveyor belt can also be applied without adjusting slide.

FIG. 4 shows outflow openings with a funnel shape. The outflow openings can also take a different form, for instance semicircular. In FIG. 4 the slit blade is coupled to the outflow opening. The slit blade can also be separate from the outflow opening.

FIG. 5 and FIG. 6 show that the collecting bin can be tipped for emptying thereof. The collecting bin can also be emptied in other manner, for instance by being tilted, wherein the material collected in the collecting bin slides out of the collecting bin.

FIG. 5 and FIG. 6 show a lifting cylinder as drive in the tipping mechanism. The drive can for instance also be another form of linear drive or a rotational drive.

The invention claimed is:
1. Device for cutting slits in a surface, comprising:
 a frame displaceable over the surface,
 a movable cutter on the frame and oriented during use toward the surface for the purpose of cutting slits in the surface,
 characterized in that the device comprises collecting means for collecting the material cut from the surface by means of the cutter, which collecting means lie behind the cutter relative to the direction of displacement of the device; and
 a dispensing device, comprising:
 a filler material container for containing filler material, which filler material container lies behind the collecting means relative to the direction of displacement of the device;
 a slit blade behind the cutter relative to the direction of displacement of the device, which blade extends at least during use in a cut slit and which blade is arranged on a funnel-shaped outflow opening which is oriented toward said cut slit;
a channel connecting the filler material container to said outflow opening
a dispensing mechanism in at least one of the channel and the filler material container for the purpose of dispensing filler material from the filler material container to said outflow opening; and
a transmission for driving the dispensing mechanism in accordance with the displacement speed of the device such that the degree of dispensing of the filler material to said outflow opening depends on the displacement speed of the device over the surface;
wherein the dispensing device is arranged such that the degree of dispensing of the filler material is such that said cut slit is filled with filler material dispensed to said outflow opening up to a height which corresponds substantially to the depth of said cut slit.

2. Device as claimed in claim 1, characterized in that the cutter can be moved in order to throw up material from the surface in a throw-up direction.

3. Device as claimed in claim 2, characterized in that the collecting means are located in the throw-up direction.

4. Device as claimed in claim 1, characterized by a hood for guiding in the direction of the collecting means the material cut out of the surface by means of the cutter.

5. Device as claimed in claim 1 characterized in that the cutter comprises a blade on a rotatable shaft.

6. Device as claimed in claim 1, characterized in that the collecting means comprise a collecting bin.

7. Device as claimed in claim 6, characterized by a tipping mechanism between the frame and the collecting bin, with which the collecting bin can be moved between a position of use and a tipping position.

8. Device as claimed in claim 7, characterized in that the collecting bin can be tipped about a tipping axis which is defined in the tipping mechanism and which is oriented relative to the direction of displacement of the device such that the collecting bin can be tilted substantially transversely relative to the direction of displacement of the device.

9. Device as claimed in claim 7, characterized in that the tipping mechanism comprises:
a hinge which defines a tipping axis and with which the collecting bin is coupled pivotally to the frame,
a drive arm which extends over a distance from the hinge defining the tipping axis, and
a drive which is connected to the drive arm.

10. Device as claimed in claim 9, characterized in that the tipping mechanism comprises a transmission between the drive arm and the drive.

11. Device as claimed in claim 1, characterized in that the channel is located below the collecting means.

12. Device as claimed in claim 1, characterized in that the dispensing mechanism comprises a rotatable dispensing shaft on which flexible blades are arranged, which flexible blades carry the filler material, which is situated on the side of the dispensing roller remote from the outflow opening, in the direction of the outflow opening when the dispensing shaft is rotated and hold back the filler material when the dispensing shaft is stationary.

13. Device as claimed in claim 1, characterized in that the dispensing mechanism comprises a conveyor belt which extends between the filler material container and the outflow opening.

14. Device as claimed in claim 1, characterized in that the dispensing mechanism comprises an adjusting slide.

15. Device as claimed in claim 1, characterized in that the transmission is connected to at least one of the drive motor, wheel, support roller.

16. Device as claimed in claim 1, characterized by agitating means at the outflow opening, by means of which agitating means the filler material can be loosened.

17. Device as claimed in claim 1, characterized in that the device comprises height-adjusting means for adjusting the distance between the frame and the surface, and thereby for adjusting the depth of the slit which is cut by the cutter during use.

* * * * *